Figure 1:
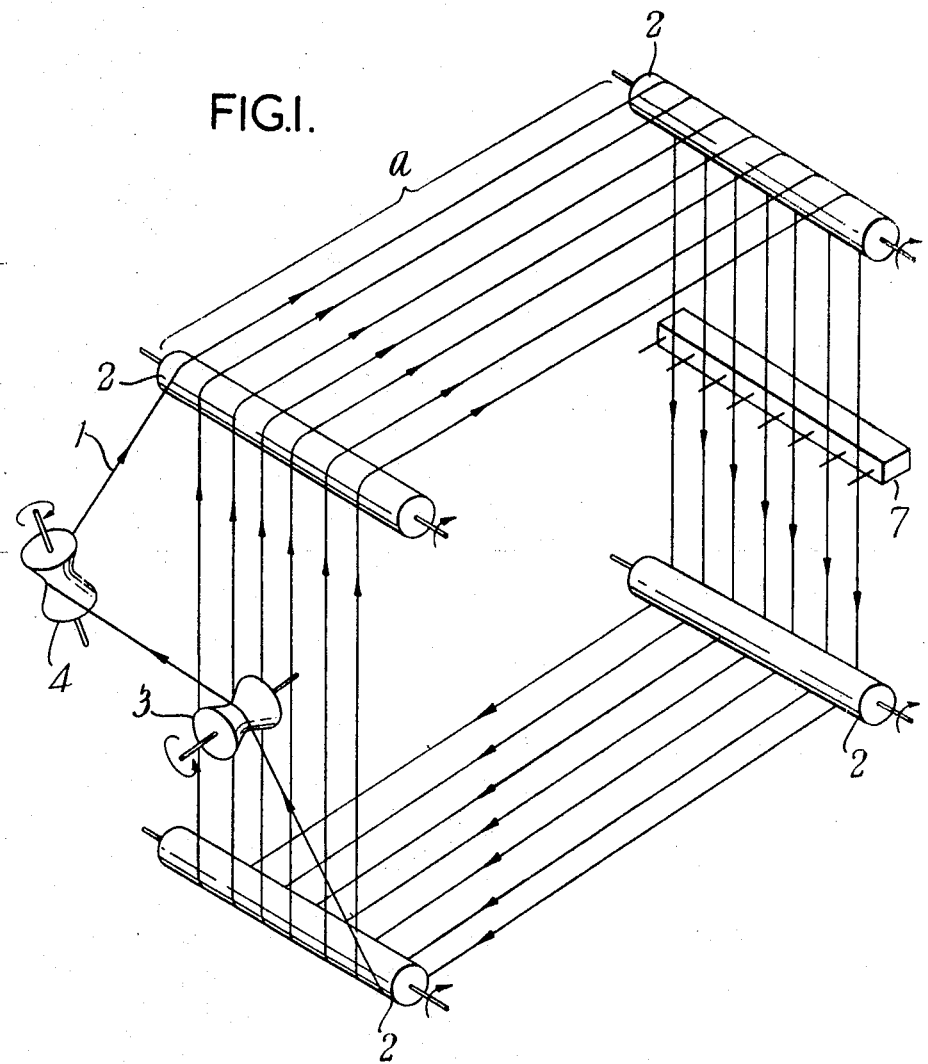

United States Patent

[11] 3,598,226

| [72] | Inventor | Lawrence Frederick Hayman<br>London, England |
|---|---|---|
| [21] | Appl. No. | 828,228 |
| [22] | Filed | May 27, 1969 |
| [45] | Patented | Aug. 10, 1971 |
| [73] | Assignee | Stone-Platt Crawley Limited<br>London, England |
| [32] | Priority | June 6, 1968 |
| [33] | | Great Britain |
| [31] | | 27047/68 |

[54] CONVEYORS
8 Claims, 5 Drawing Figs.

| [52] | U.S. Cl. | 198/129 |
|---|---|---|
| [51] | Int. Cl. | B65g 15/10 |
| [50] | Field of Search | 198/1, 129;<br>271/49 |

[56] References Cited
UNITED STATES PATENTS
1,528,557  3/1925  Luce ........................... 198/129

*Primary Examiner*—Edward A Sroka
*Attorney*—Sommers & Young

ABSTRACT: The invention concerns a continuous article-carrying conveyor, particularly a conveyor for carrying textile articles through a processing machine. The conveyor consists of individual filament flights disposed at predetermined intervals across the conveyor and forming a continuous helical or spiral coil. The term filament is to be understood to include thread.

FIG.I.

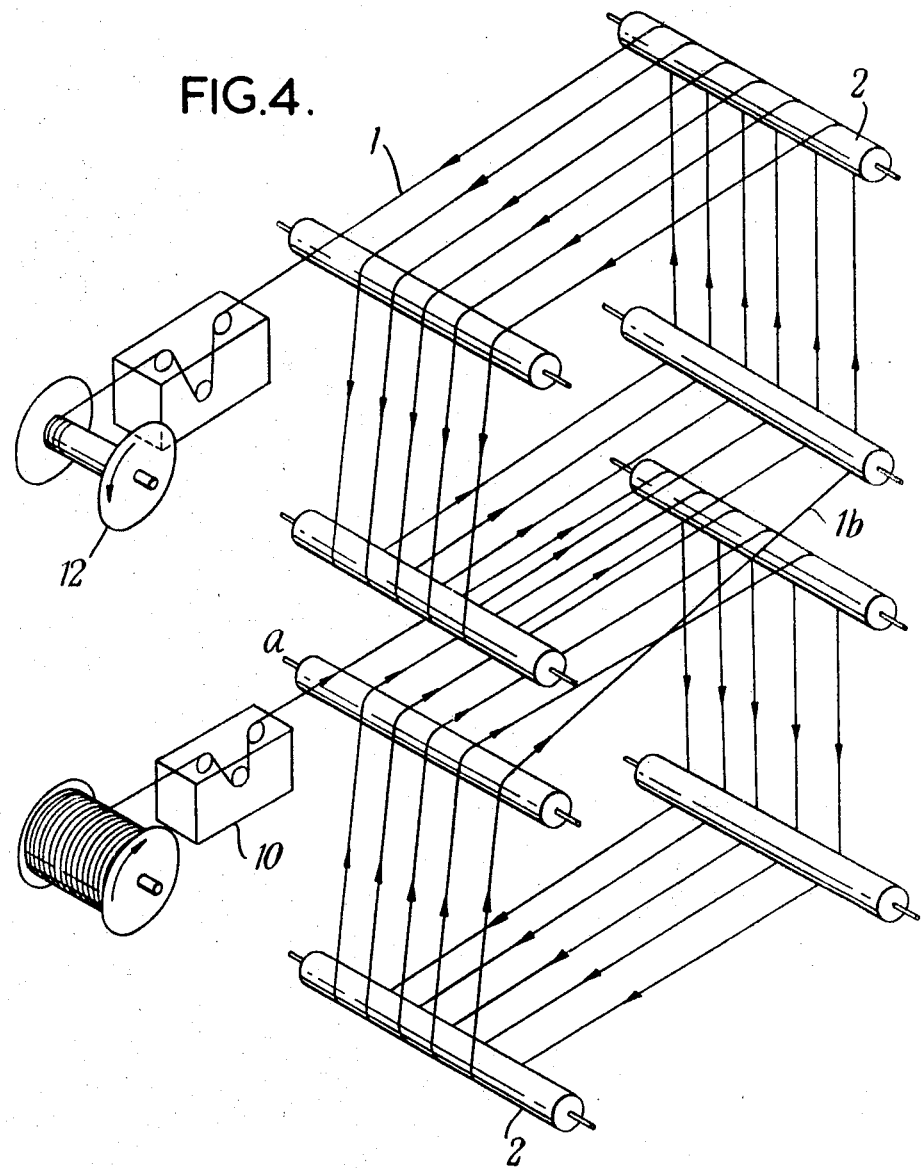

CONVEYORS

This invention relates to conveyors, especially but not exclusively in processing machines which incorporate conveying systems for carrying articles to be processed through the machines and more particularly where the nature of the process is such that the material of which the conveyors are made is subject to damage or deterioration after extended periods of operation.

In a number of processes, it is required to pass individual articles through a machine or series of machines and subject them to, say, chemical treatment, mechanical manipulation and/or squeezing stages, as by the action of mangles or rollers. In such processes, the use of conveyor belts of a substantial thickness may interfere with the process by reducing its efficiency.

It is usual for a belt to be made as an endless loop passing through the operating path of the machine and returning to the beginning of the machine to repeat the same passage. In the course of extended running, such a belt is subjected to many thousands of passes through the process and its thickness will be reduced. The cumulative effect in many processes is to reduce the life of the belt material to such an extent that the cost of replacement represents a significant proportion of the total processing costs. In addition, belt breakages can cause extensive holdups in production. Furthermore, the belt exercises a limiting effect on the efficiency of the process.

It is an object of the invention to provide a conveying medium which is capable of carrying articles being processed through a machine at high speed with little reduction in the efficiency of the process, but with a long life and with low costs, and which can be easily and quickly installed and replaced.

The invention is applicable with particular advantage to machines for the continuous processing of individual textile articles as described in the specification of U.S. Pat. application Ser. No. 539,830 (A.F. Pfeil), although it is applicable also to other machines which require the conveyance of individual articles, especially flat articles, needing support and control during their passage through a machine or process or which have to provide for frequent belt changes due to wear, contamination or change of process.

Conveying systems are known which include a number of individual wires, threads or tapes used in conjunction with a continuous belt or belts to control articles being carried by the belt or belts and to ensure that the articles separate from the belt or belts where the required path of the articles diverges from that of the belts.

In accordance with the present invention, a continuous article-carrying conveyor comprises a carrier matrix consisting of thread or filament flights which are disposed at predetermined intervals across the path of the conveyor and run along the path of conveyance which the articles are to follow, the thread or filament returning to the beginning of the said path so as to form a continuous helical coil or spiral. The spacing of the flights, dependent upon the nature of the articles and the degree of disturbance or agitation in the process, is selected to ensure adequate support to the articles. The spacing may be maintained by a comb device at at least one end of the said path. The matrix as a whole is maintained in its correct path by running over a series of guide rolls. The requisite tension may be maintained in the thread or filament by adjusting the positions of one or more of the rolls to take up slack in the thread.

With a conventional belt, special means of guidance are required to ensure that the belt stays flat and is prevented from creasing. Alternatively the belt must be made thick and rigid. As, in a conveyor in accordance with the invention, no cross threads exist, this problem does not arise. The conveyor may be controlled solely by the aforesaid combs, by the tension in the thread or filament, and by the shape or size and angle of mounting of the guide rolls.

The thread or filament may consist of multistrand yarn or may be a single filament of metal or manmade fiber. Preferably, it consists of a continuous filament of a synthetic fiber material such as nylon and terylene, which have particular advantages where wet processes are concerned in that they absorb only very small quantities of moisture and are resistant to fibrilation and chemical damage.

In processes involving moisture removal by means of mangles or rollers, the efficiency of the mangle is impaired by the use of a thick belt. Even with a thin belt of woven material, the windows formed between the weft and warp threads carry moisture through the mangles which may then be retransferred to an article being processed. It is an advantage of the present invention that the absence of cross threads obviates these moisture-carrying windows and an increase of moisture expression of as much as 15 percent of the dry weight of an article processed can be obtained. This is especially important in processes involving chemical treatment and rinsing, as liquor, especially concentrated liquor, carried on from one part of the process to the next produces contamination or limits the efficiency of a rinsing process.

A conveyor in which thread or filament flights forming the carrier matrix are joined to one another to form a continuous helical coil or spiral, each loop of which follows the required conveyor path, and the ends of the first and last loops are connected together to produce one endless or continuous length may be referred to as a monowarp conveyor. With such a conveyor, it is not necessary to provide individual tensioning means for each loop or individual detectors to stop the machine if a single flight breaks. Detectors can be provided at intervals, so that if a flight breaks the remainder of the conveyor continues to convey satisfactorily until such times as the gap produced by the breakage reaches a critical width beyond which the articles would not be adequately supported.

Each loop of such a monowarp conveyor may run through the working section of the conveyor along a line parallel to the direction of conveyance, i.e. generally the longitudinal axis of the machine, and then, by means of the combs, be caused during its return path to traverse through one pitch width, so that it reenters the working section as the next loop. An individual portion of the thread or filament therefore progressively traverses the full width of the machine. It is then returned to the opposite side of the machine over two or more grooved pulleys, reentering the machine as the first loop.

This embodiment of the invention is illustrated by way of example in FIG. 1 of the accompanying diagrammatic drawings, in which the single filament 1 is carried around rolls 2 and over pulleys 3, 4 in a helical path, a comb 7 or combs providing for guidance and separation of the several flights. The working section of the conveyor is indicated at $a$. Instead of following an open helical path, the return section could be disposed closely below the working section $a$ and the final return from the last to the first loop could be carried around the outside of the conveying path and in substantially the plane thereof.

Figure 2:
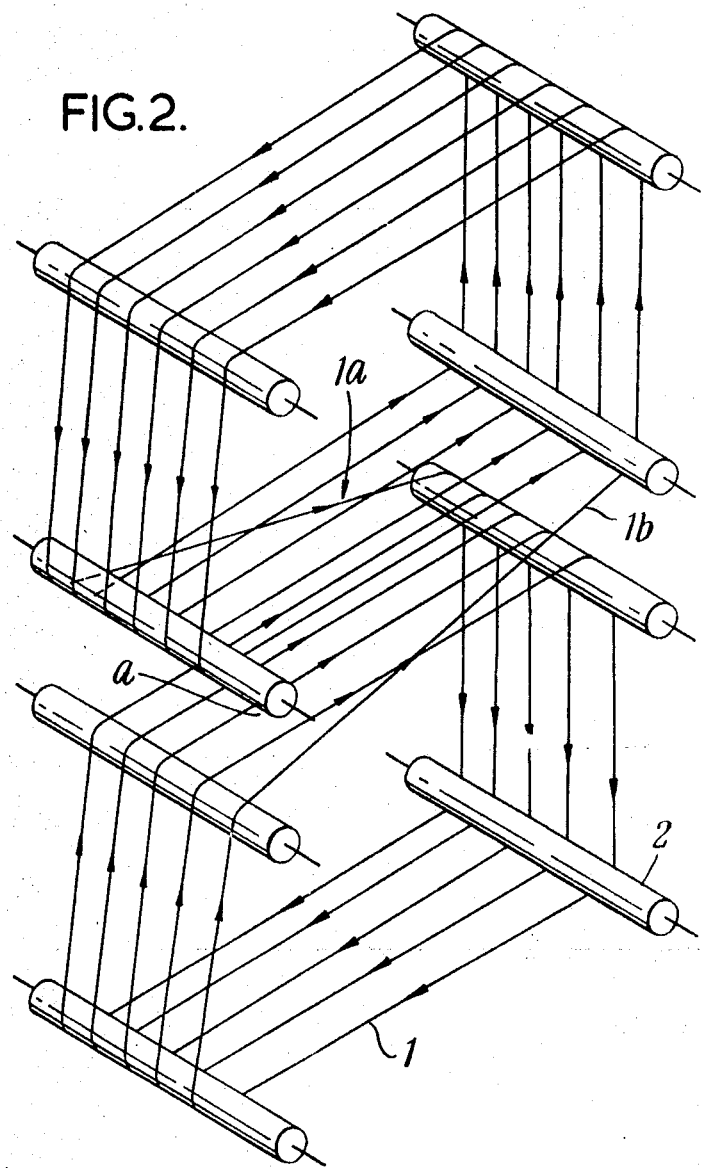

FIG. 2 of the drawing illustrates an arrangement suitable for a machine in which a double conveyor is required so that, in their passage through the machine, the articles processed are supported and controlled between upper and lower conveyors. The two conveyors, or conveyor elements, providing the working section between them at $a$, are constituted by a single continuous filament 1 guided in two helical monowarp paths, the transition from the upper to the lower path being indicated at $1a$ and that from the lower to the upper at $1b$, the two transitions being to opposite sides of the course followed by the articles.

Figure 3:
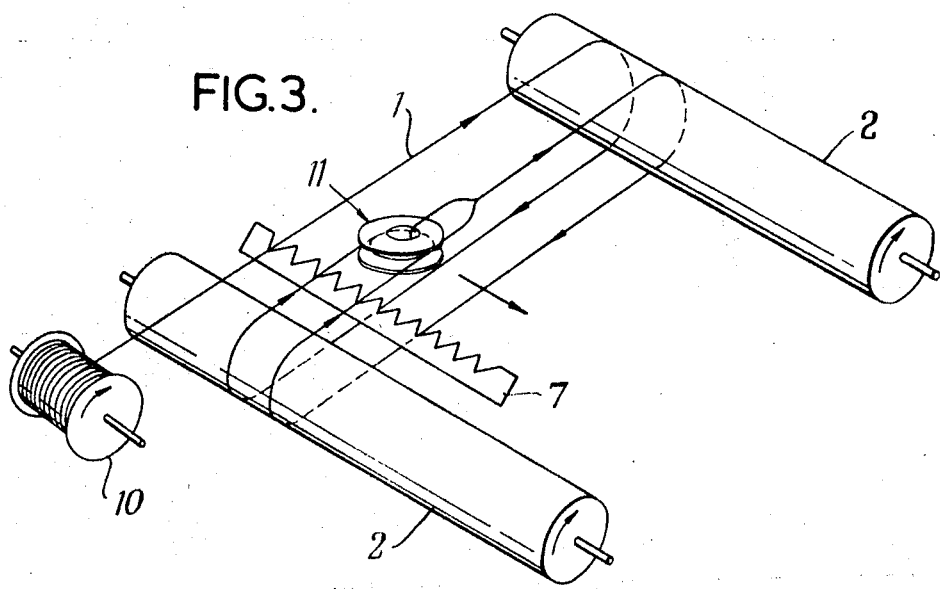

FIG. 3 illustrates one way in which the filament 1 can be fed initially into the monowarp from a feed reel 10 associated with tension-control means, using a grooved disc bobbin 11. As will be seen, the filament 1 is passed from the reel 10 around the far roller 2, the near roller 2, and the grooved bobbin 11 and thence around both rollers 2 to the bobbin 11 where its end is connected to the said bobbin by a loop passed therethrough.

The directions of rotation of the rollers 2 and of the several parts of the filament 1 are indicated by arrows. The part of the filament coming from the reel 10 engages in the first gap of the comb 7. The two parts adjoining the groove in bobbin 11 engage in a pair of alternate gaps in the comb. During continued rotation of the rollers 2, the bobbin 11 will follow the path of the end of the filament, so that in the course of its next passage around the rollers 2, its center will become shifted laterally (to the right in FIG. 3) by one gap pitch and the two parts adjoining the groove in the bobbin will, when they reengage the comb 7, come to lie in the gaps next to the right of those which they occupy in the figure. The process will continue until the monowarp has been completed. In addition to its function in the initial introduction of a filament, the disc bobbin 11 can also be employed with advantage when a gap in the filament due to breakage has to be filled. The bobbin need not be employed, however, when a fresh filament has to be substituted for that already in the machine.

In FIG. 1, the comb 7 is indicated as comprising a plurality of pegs or fingers and in FIG. 3 as a toothed member. A convenient form of comb for use in practice may consist of a series of discs of a plastics material disposed side by side on a shaft and having spaced V-shaped gaps between their rims. The discs may be designed to have two positions, a normal position and an abnormal position in which the above-described disc bobbin 11, when in use, is free to pass the comb.

Materials which can be used for such monowarp conveyors, for example a nylon (Type 6) monofilament of 0.027 inch diameter, are inexpensive compared with conventional conveyor-belt materials. It is also an advantage that a monowarp can be replaced by a new continuous length of filament without interrupting the process served by the conveyor. In a wide machine, such as a continuous laundry machine for washing full-width flat articles which has an operating width of 10 feet and a length of 20 feet and in which a double conveyor is required, the monowarp may suitably have a pitch of, say, one-quarter or one-half inch. The total length of filament in the machine may be as much as 48,000 feet and, if the machine operates at 100 feet per minute, any particular portion may take 8 hours to pass completely through the machine. During this period such a portion will have passed through the process approximately 1,000 times.

For processes using agents which have a particularly damaging effect, such as strong alkalis or bleaches, an embodiment of the invention such as is shown in FIG. 4 of the drawing may be used. In this case, the filament is fed from a reel 10 associated with tension-control means and containing, say, 72,000 feet, passes through two helical paths, as in FIG. 2, but is then wound upon an empty reel 12 driven by an automatic winding device and again associated with tension-control means. At the end of, say, 10 hours operation, the reel 10 will be empty and the reel 12 full. The full reel is removed and the empty one transferred to its position. A fresh full reel is introduced at 10 and its filament is fed in. This operation can be carried out in a few minutes.

The cost of the filament is so low compared with a textile belt that there are considerable economic advantages even if the filament is used once only.

Not only can a complete monowarp be easily and quickly replaced by a new one, but, if the process is to be changed, a monowarp of a different kind selected to suit the particular conditions of the new process can equally easily be fitted.

With such a continuous filament, the tension applied to the filament in the machine may be critical. The behavior of the filament depends on the moisture conditions and temperature to which it is subjected in the processes. The filament may extend by a significant amount when initially installed. This must be taken up by means of adjustable guide rolls, after which stability will be maintained during the life of the filament. Difficulties which may occur when replacing the monowarp filament can be overcome by controlling the tension under which the new filament if fed into the machine. With a filament of, for example, 0.027 inch diameter, an operating tension of 2 pounds 1,000 g.), will generally be suitable. With commercially available grades of nylon and terylene, the extension in operation will be tolerable, giving satisfactory operation with a sufficient safety factor to protect the monowarp against accidental damage. At the same time, the material of the filament still retains sufficient elasticity to absorb the variations in tension and relaxation when passing between rollers, round guide rolls and through other components of the machine.

Figure 5:
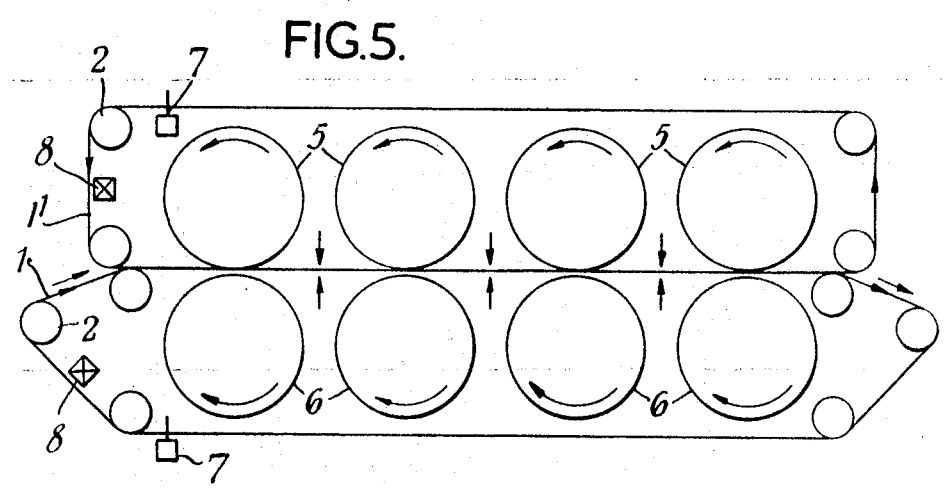

FIG. 5 of the drawing illustrates purely diagrammatically the use of two monowarps 1 and 1' in a continuous-process flatwork washing machine. Mangle rollers are shown at 5 and 6, combs at 7 and broken-filament detectors at 8. As seen in transverse section, the individual flights of the two monowarps may be staggered in the working part of the conveyor. The filament pitch in the upper and lower monowarps need not necessarily be identical. Stripper discs (not shown) forming V-shaped slots for the filaments may be used in per-se-known manner to prevent adherence of the filaments to other conveying means.

Detectors may comprise light "flags" which rest upon the filament. In the event of breakage, a flag will fall and, by interrupting a light or ultrasonic beam, cause the machine to stop. A detector may be provided for each flight, but this is not essential.

I claim:

1. A continuous article-carrying conveyor comprising a carrier matrix consisting of filament flights which are disposed at predetermined transverse intervals across the conveyor, each flight following the path of conveyance which the articles are to follow, the filament returning from the end to the beginning of the said path to become the start of the next adjacent flight so as to form at least one continuous coil, and at least one comb device engaging said filament to maintain said transverse intervals.

2. A conveyor according to claim 1, wherein the filament is a single strand of a plastics material such as nylon and terylene.

3. A conveyor according to claim 1 in combination with means of introducing the said filament, comprising a grooved disc bobbin to a central hole in which the filament is connected by a loop, which filament is carried through a tooth gap of said comb device and to the grooved rim of the said bobbin to form the first turn of the coil, and thence around the said rim and through a tooth gap, spaced by one unoccupied gap from the first-named gap, to form the second turn of the coil.

4. A conveyor as claimed in claim 1 and incorporated in a machine for the continuous processing of textile articles.

5. A conveyor according to claim 1 wherein the filament is guided in the paths of conveyance and return around smooth rollers, adjacent flights being maintained at the said intervals by parts, projecting between them of the said comb device.

6. A conveyor according to claim 1 wherein the said comb device is disposed to cause the said flights to pass through the conveyance path parallel to the longitudinal axis of the conveyor, and in the return path to diverge from parallelism with the said axis by an amount equal to the said interval between adjacent flights.

7. A conveyor according to claim 1 wherein the comb device is movable between a normal position in which parts, projecting between adjacent flights, maintain the said flights at the said intervals and an abnormal, retracted, position.

8. A conveyor according to claim 1 wherein the comb device comprises a series of discs disposed side by side with gaps between their rims.